United States Patent
Simon et al.

(10) Patent No.: US 9,352,817 B2
(45) Date of Patent: May 31, 2016

(54) DIRECTED ACOUSTIC BROADCAST ARRAY

(71) Applicant: Ideal Innovations Incorporated, Arlington, VA (US)

(72) Inventors: David Simon, Alexandria, VA (US); Loran Ambs, Williamsburg, VA (US)

(73) Assignee: Ideal Innovations, Inc., Arlington, VA (US)

( * ) Notice: Subject to any disclaimer, the term of this patent is extended or adjusted under 35 U.S.C. 154(b) by 45 days.

(21) Appl. No.: 14/216,982

(22) Filed: Mar. 17, 2014

(65) Prior Publication Data

US 2014/0262601 A1 Sep. 18, 2014

Related U.S. Application Data

(60) Provisional application No. 61/800,374, filed on Mar. 15, 2013.

(51) Int. Cl.
| | |
|---|---|
| *G10K 11/26* | (2006.01) |
| *B63H 19/02* | (2006.01) |
| *G02F 1/15* | (2006.01) |
| *G10K 11/34* | (2006.01) |
| *G06F 17/30* | (2006.01) |
| *F03B 13/10* | (2006.01) |
| *F03B 13/14* | (2006.01) |

(52) U.S. Cl.
CPC ............... *B63H 19/02* (2013.01); *F03B 13/10* (2013.01); *F03B 13/14* (2013.01); *G02F 1/15* (2013.01); *G06F 17/30864* (2013.01); *G10K 11/26* (2013.01); *G10K 11/346* (2013.01); *Y02E 10/38* (2013.01)

(58) Field of Classification Search
USPC ............................................. 381/92
See application file for complete search history.

(56) References Cited

U.S. PATENT DOCUMENTS

| | | | | |
|---|---|---|---|---|
| 7,106,180 | B1 * | 9/2006 | Pompei | A01M 29/18 116/22 A |
| 2010/0231368 | A1 * | 9/2010 | Nakayama | B60Q 5/00 340/425.5 |
| 2011/0026729 | A1 * | 2/2011 | Nakayama | B60Q 5/008 381/86 |
| 2011/0032087 | A1 * | 2/2011 | Nakayama | B60Q 5/008 340/384.1 |
| 2011/0032122 | A1 * | 2/2011 | Hayashi | G08G 1/04 340/943 |
| 2011/0175713 | A1 * | 7/2011 | Nakayama | B60Q 5/006 340/435 |
| 2011/0181442 | A1 * | 7/2011 | Nakayama | B60Q 5/008 340/933 |
| 2011/0304445 | A1 * | 12/2011 | Nakayama | B60Q 5/008 340/425.5 |
| 2012/0318932 | A1 * | 12/2012 | Parida | B61L 23/00 246/473 R |
| 2013/0154852 | A1 * | 6/2013 | Kim | B60Q 5/006 340/904 |
| 2013/0214097 | A1 * | 8/2013 | Graber | B61L 29/246 246/174 |

\* cited by examiner

*Primary Examiner* — Brenda Bernardi

(57) ABSTRACT

A plurality of sound emitters mounted on a vehicle having a configurable phase of emission and configured such that they focus the beam pattern in a selected direction.

6 Claims, 5 Drawing Sheets

DIRECTED ACOUSTIC BROADCAST ARRAY

CROSS-REFERENCE TO RELATED APPLICATION

This application claims the benefit of U.S. provisional patent application No. 61/800,374.

BACKGROUND

In many urban areas, the sounds of vehicle horns and emergency vehicle sirens are common place. While these horns and sirens serve an important purpose, they also create noise pollution, a known contributor to deleterious cardiovascular effects in humans. In many developed areas, residences and businesses are located above busy traffic areas, a situation in which surrounding infrastructure effectively amplifies the sound reaching these residences and exacerbates noise pollution problems. Additionally, many sirens utilize simple acoustic horns in order to amplify their sound level—horns which have directional properties that are not optimized for their intended use. For example, the main purpose of emergency vehicle sirens is to alert vehicles on the street ahead of the emergency vehicle, and on adjoining side-streets, so that those vehicles will yield the right-of-way. However, these sirens do not focus their transmitted acoustic energy at ground level, and can often be clearly heard on the upper floors of office buildings or residences, where the sound they produce does not serve a useful purpose. In addition, the reflections of the sound waves often make it difficult for other drivers to determine the location of the emergency vehicle.

What is needed to solve the problem of reducing noise pollution resulting from sirens and other acoustic sources is a device that targets its acoustic energy only in the directions needed. A siren with a three-dimensional sound radiation pattern (wide horizontal beam pattern angle and narrow vertical beam pattern angle), so that the siren can be heard ahead and to the sides of the vehicle, but is strongly attenuated in the vertical direction, accomplishes this objective.

SUMMARY

A sound projection system, comprising a plurality of sound emitters mounted on a vehicle; the sound emitters having a configurable phase of emission; the sound emitters collectively having a beam pattern; and the sound emitters configured such that they focus the beam pattern in a selected direction.

DETAILED DESCRIPTION

Our solution to the problem of directing a siren or loudspeaker's radiation pattern is a multi-element array of acoustic emitters that can be mounted on a vehicle. These multiple, spatially-separated sound emitters may be appropriately phased resulting in a three-dimensional sound radiation pattern that focuses transmitted acoustic energy in the directions where it most usefully serves its intended purpose. The speaker phasing may be fixed, creating a desired sound propagation pattern for a given waveform, or it may vary in real-time enabling arbitrary input waves to be appropriately directed. Line arrays of acoustic emitters are commonly used in auditoriums, concerts, fairgrounds, and other public assembly areas. However, they are not currently employed on vehicles. Phased beam shaping is used with ultrasound measurement devices, fixed public address systems, and home theater systems, but is not described in prior art for mobile emergency alerting systems.

Figure 1:
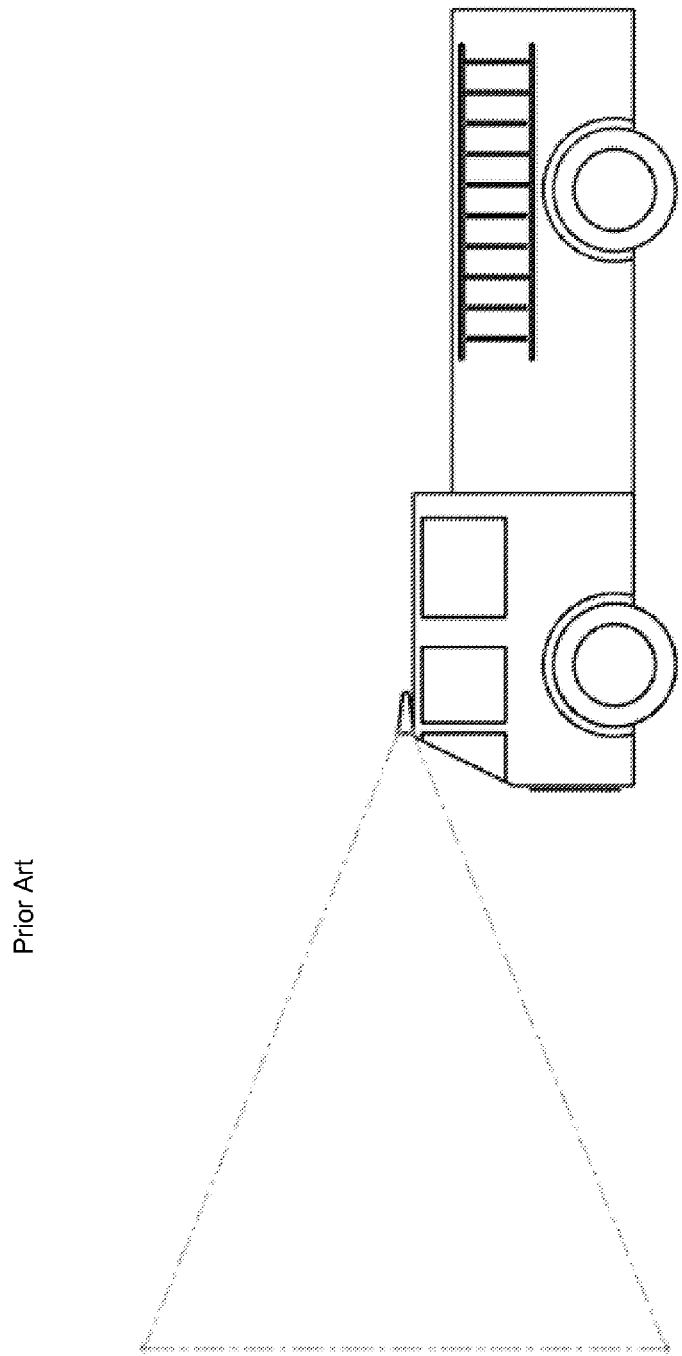
FIG. 1 depicts a side view of the beam pattern of a common siren mounted on an emergency vehicle.
Figure 2:
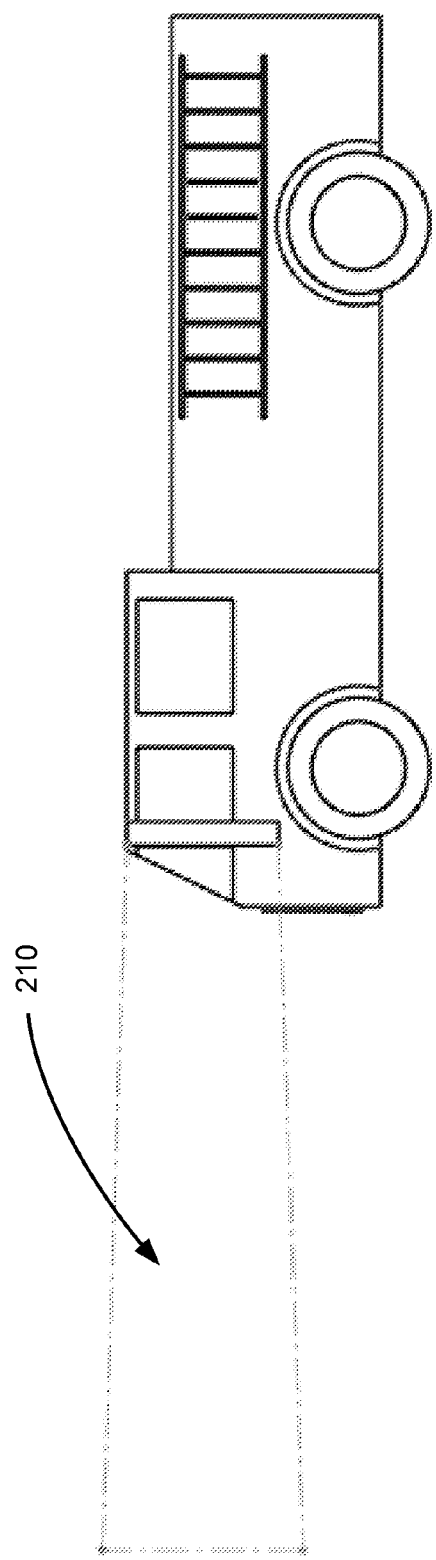
FIG. 2 depicts a top view of a narrow beam pattern siren mounted on an emergency vehicle.

As shown in FIG. 2, in a preferred embodiment of this device would produce a sound distribution pattern substantially focused in a horizontal plane 210, and further focused primarily towards the front and sides of the vehicle (horizontal beam angle greater than 90° and less than) 270° with a narrow vertical beam angle of less than 60°. This can be achieved by using two or more audio sources separated by a fixed horizontal distance, while controlling the relative phase of the signals emitted by each audio source. The relative phasing of each audio source's output may be accomplished mechanically using varying length horns, electronically by applying fixed phase delays to each source input, electronically by varying the phase delay of each source in real-time as a function of frequency, or a priori by using appropriately-phased pre-recorded inputs for each element of the audio source array. The result is that the combined beam pattern for all the speaker elements can be designed for a wide range of frequencies and sound distribution goals. Single speakers such as horns with rectangular mouths are capable of providing different beam angles along the vertical and horizontal plane, but these patterns are highly frequency dependent, and are not optimized for the urban environment.

For an emergency vehicle's siren, the correct phase for each constituent frequency can be calculated and using the acoustic principle of superposition, the resultant multi-frequency signal can be generated and prerecorded for each speaker element. This ensures consistent playback with the desired beam pattern. The system can also be used as a loudspeaker, in which case a real-time controller can use a simple algorithm to alter an arbitrary signal waveform (to include Speech) for optimum broadcast.

Figure 3:
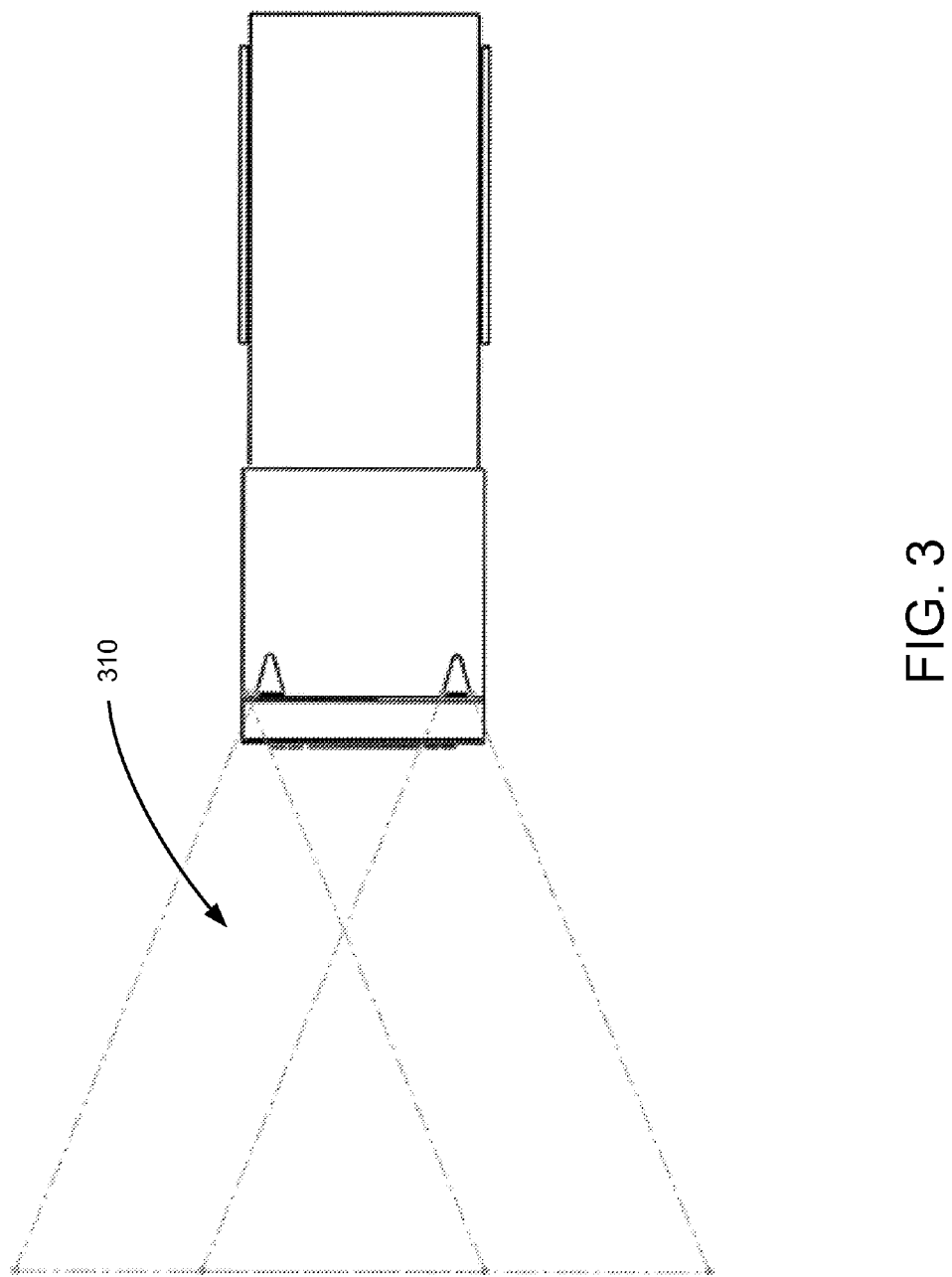
FIG. 3 depicts a top view of the beam pattern of a pair of vertically-mounted line speaker arrays mounted on an emergency vehicle
Figure 4:
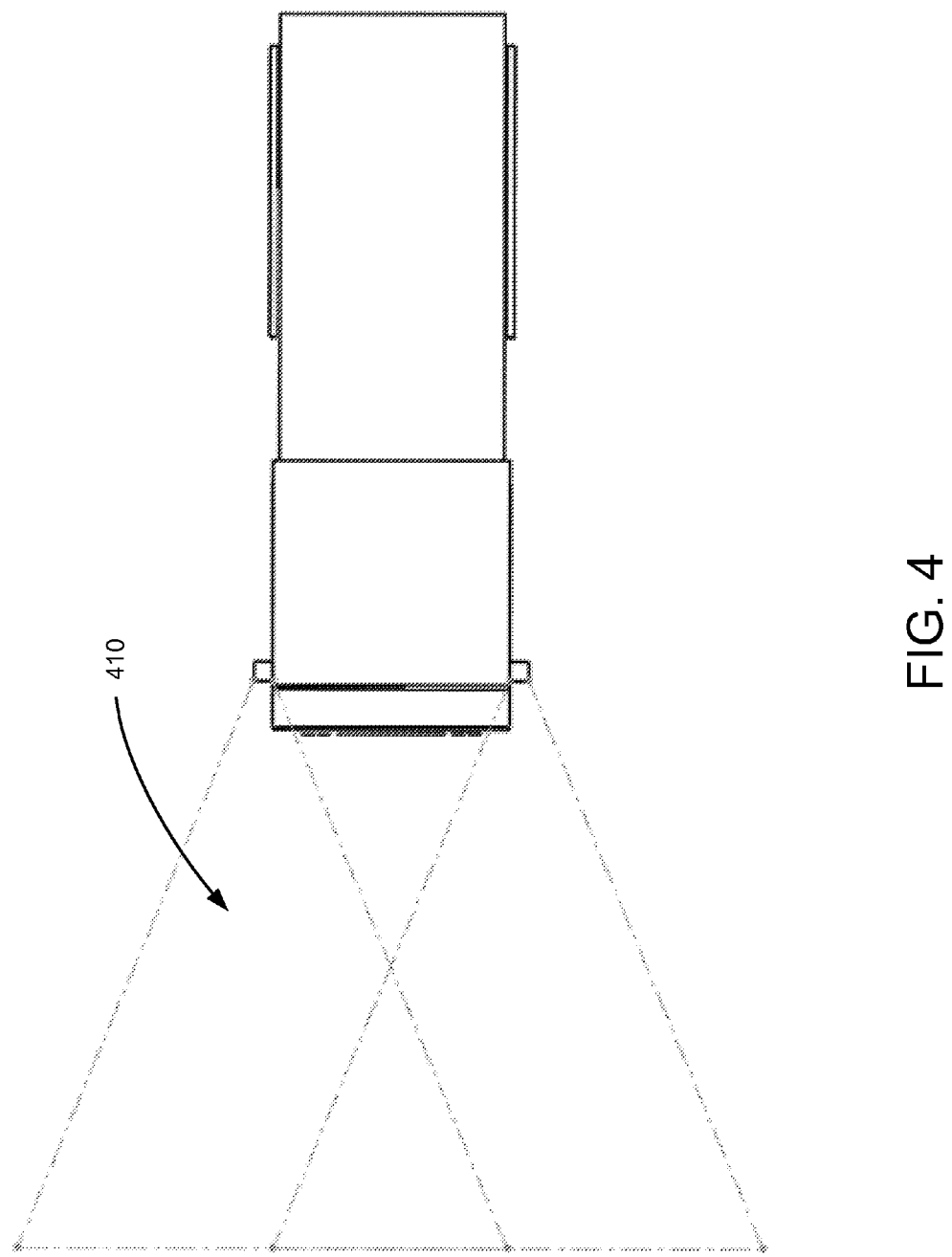
FIG. 4 depicts a top view of the beam pattern of a pair of vertically-mounted line speaker arrays mounted on an emergency vehicle

An alternative embodiment could alter the projected beam pattern in real-time, dependent on the user's needs. For example, a narrower horizontal pattern could be employed in urban area with many tall buildings to reduce unwanted sound reflections and destructive interference, while a broader beam pattern 310 of FIG. 3 and 410 of FIG. 4, could be used in suburban or rural areas, or when traveling along a wide highway. This real-time beam pattern variation can also be a function of vehicle speed or other parameter enabling sound to be focused further ahead of fast moving vehicle, and having greater side lobes when the vehicle is moving slower.

Another method of controlling the sound distribution pattern is to use sound emitters with multiple waveguides. Each waveguide would introduce a unique phase angle to the source signal, and the output from these waveguides would interfere in a similar manner as unique signals from multiple sources. The advantage of this approach is that it does not require any additional signal processing hardware. The disadvantage is that it is not possible to tune each frequency uniquely.

Figure 5:
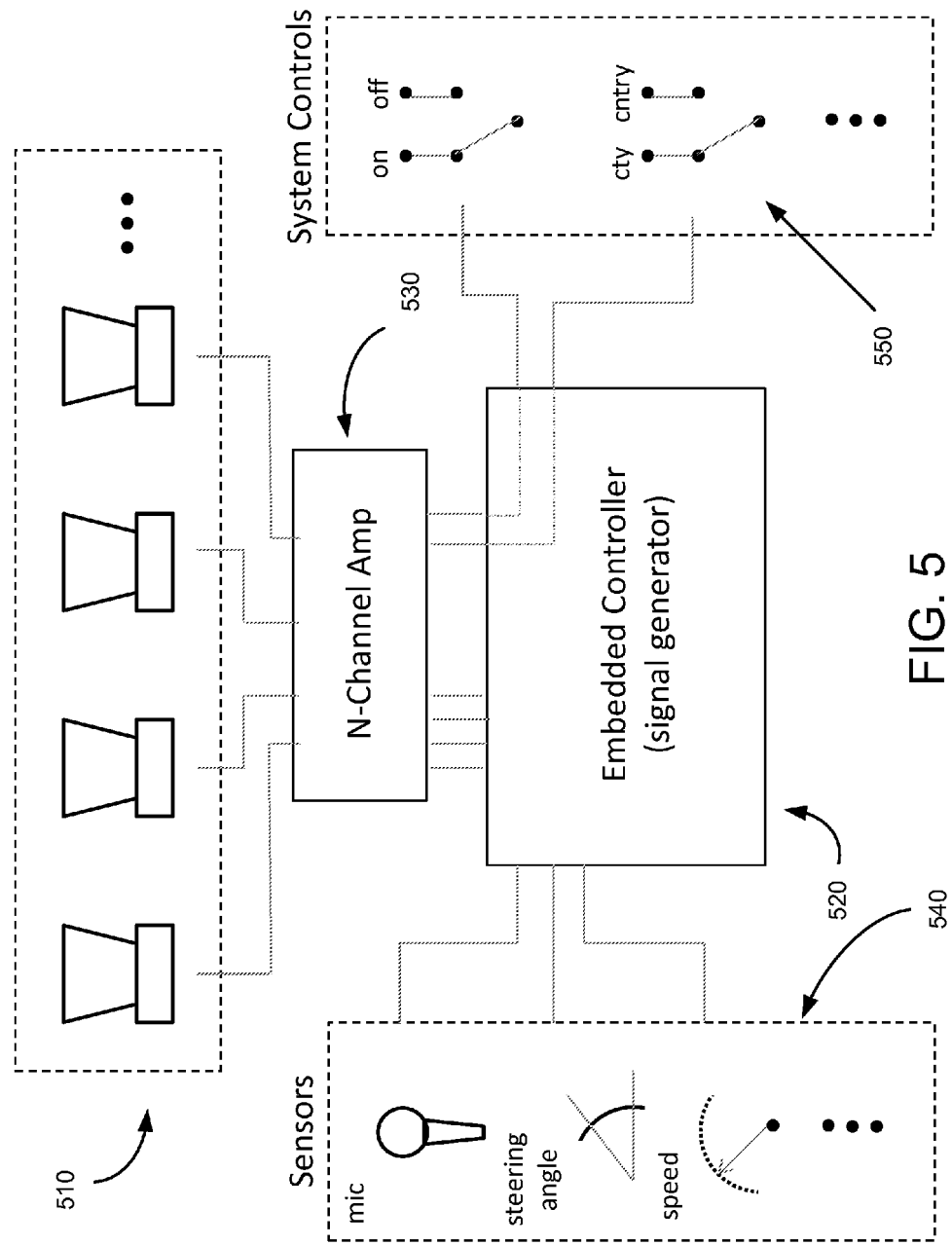
FIG. 5 depicts a control system

As shown in FIG. 5, a specific embodiment of the invention may be described as follows: An emergency vehicle is equipped with a DABS system comprised of (1) sound emitters 510, (2) a sound generator/multi-channel phase controller 520, and (3) a amplifier 530. The sound emitters are anticipated to be electronically-controlled, amplified speakers capable of rebroadcasting input audio signals at volumes controlled by the operator. The input audio signals may be comprised of single or multiple frequencies, and the frequency content may be static or dynamic and controlled by system controls 550. An example of this type of electronically-controlled, amplified speaker are conventional PA systems such as the Anchor Audio MegaVox Pro Public Address System (119 dB, 15 lbs, 15 lbs, AC/DC power supply, 400 Hz-10 kHz frequency response). In the specific embodiment, a vehicle may be equipped with an array of four Anchor MegaVox Pro Public Address units mounted on the roof of the vehicle using steel brackets and electronically connected to a four channel audio source.

The four outputs of the four channel audio source will be appropriately time-shifted for each of the four Anchor MegaVox Pro Public Address units to affect a steerable audio beam which will be steered based on multiple inputs. The four channel audio source may be a computer, or embedded DSP such as a DSpace MicroAutoBox-II embedded controller. This system has sixteen analog (0-5V, 16-bit) inputs 540, and four analog (0-4.5V, 12-bit) outputs. It also has 40 digital inputs and outputs. The inputs to the DSpace MicroAutoBox-II may include information on the state of the vehicle, and the user's requirements; as specific examples, inputs may include:

on/off,
Degree of beam focus (narrow to wide),
mode (e.g., city/suburb),
time of day,
steering wheel angle, and
vehicle speed.

It may also include measurements of the ambient environment (noise level), and measurements of the system output (measured output of each speaker for closed-loop system control).

Additionally, it may be possible to use the same multi-channel controller approach in conjunction with single tone emitters such as sirens. The input signal to each of the sirens may be time-shifted by the controller using open-loop control to affect a steerable beam, or they may be paired with microphones and modulated with closed-loop control to improve performance.

If it is desired to modulate the output timing of each of the sound emitters mechanically, this can be affected by using solenoid-driven horns (hollow tubes) placed in front of each sound emitter. Each solenoid would mechanically adjust the length of the tube through which sound waves would have to pass after being generated by each sound emitter. The control of the tube lengths, mechanically affected by solenoids, would be controlled by a digital system controller, such as the DSpace MicroAutoBox-II described above.

A one dimensional, line array allows the beam to be steered in directions perpendicular the line array. A two dimensional array enables the beam to be steered is two dimensions. Notes from Human Factors in Auditory Warnings—Edited by Neville A Stanton & Judy Edworthy, Published by Ashgate Publishing Ltd 1999 (this text is incorporated by reference into this specification).

There are three main types of information that allow the brain to localize sound. The first two are known as binaural cues because they make use of the fact that we have two ears, separated by the width of our head. A sound which emanates from either side of the mid-line will arrive first at the ear closest to it and will also be loudest at the ear closest to it. At low frequencies the brain recognizes differences in the time of arrival of the sound between the ears, and at higher frequencies the salient cue is the loudness/intensity difference between the sound at each ear. The use of these two types of cue is known as the 'duplex' theory and was proposed by Lord Raleigh as long ago as 1877. For single frequencies these cues are, however, spatially ambiguous. The inherent ambiguity has been described as the 'cone of confusion' and this arises from the fact that for any given frequency there are numerous spatial positions that generate identical timing/intensity differences and these can be graphically represented in the form of a cone, the apex of which is at the level of the external ear. The cone of confusion is the main reason for our not being able to localize pure tones (Blauert, 1997; Wightman and Kistler, 1993). The 'kilo' siren is characterized by a two-tone sound (670-1100 Hz, 55 cycles/min); the 'Pulsar', a pulsating sound (500-1800 Hz, 70 cycles/min.); the 'wail', a continuous sound rising and falling (500-1800 Hz, 11 cycles/min) and the 'yelp', a continuous and fast warbling sound (500-1800 Hz, 55 cycles/min).

Difficulties in determining the direction from which emergency vehicle sirens are approaching are widely acknowledged. In fact the emergency vehicle siren has been described as 'an extremely limited audible warning device' (De Lorenzo and Eilers, 1991). A recent study in the Annals of Emergency Medicine has shown that an ambulance is most susceptible to collisions with other vehicles when crossing road junctions. This happens, primarily, because the drivers of the cars or trucks are unable to determine accurately the direction of the approaching ambulance. In one year, in the USA alone, 537 injuries and 62 deaths arose from accidents involving ambulances (Hunt et al., 1995).

The invention claimed is:

1. A sound projection system, comprising
   a plurality of sound emitters mounted on a vehicle;
      the sound emitters having a configurable phase of emission;
      the sound emitters collectively having a beam pattern;
      the sound emitters configured such that they focus the beam pattern in a selected direction; and
      the plurality of sound emitters to comprise of two or more arrays of sound emitters, and sound emitters are arranged along a single axis and pointed perpendicular in the same direction to that axis.

2. The sound projection system of claim 1, wherein the beam pattern covering an angle in the horizontal direction of more than 90° and less than 270° in the horizontal direction; and the beam pattern covering an angle in the vertical direction of less than 600.

3. The system of claim 1, wherein a prerecorded multi-frequency sound wave is replayed on the system where the sound wave played through each emitter in the array consists of the same major frequencies, but with different time-based phase shifts for each frequency to produce a desired beam pattern at multiple frequencies.

4. The system of claim 1 in which multiple waveguides are used to create a desired beam pattern.

5. The system of claim 1 in which the beam pattern on the system is user selectable.

6. A sound projection system, comprising
   a plurality of sound emitters mounted on a vehicle;
      the sound emitters having a configurable phase of emissions;
      the sound emitters collectively having a beam pattern;

the sound emitters configured such that they focus the beam pattern in a selected direction; and the beam pattern of the system is adjusted and controlled in real time through a control algorithm, and said control algorithm adjusts the phase between emitters in real-time dependent on frequency content.

* * * * *